United States Patent [19]

Browne

[11] Patent Number: 4,576,727

[45] Date of Patent: Mar. 18, 1986

[54] PHOSPHATE-FREE DETERGENT COMPOSITION FOR WASHING OF TEXTILES IN HARD WATER

[75] Inventor: Gwendolen Browne, Rotterdam, Netherlands

[73] Assignee: DeBlaueve Lier B.V., Rotterdam, Netherlands

[21] Appl. No.: 636,556

[22] Filed: Aug. 1, 1984

Related U.S. Application Data

[62] Division of Ser. No. 493,273, May 10, 1983, Pat. No. 4,534,876.

[30] Foreign Application Priority Data

May 12, 1982 [NL] Netherlands ........................ 8201953

[51] Int. Cl.$^4$ ........................ C11D 7/12; C11D 7/42; C11D 17/00; C08K 3/26

[52] U.S. Cl. .......................................... 252/90; 8/137; 252/142; 252/156; 252/174; 252/174.13; 252/350

[58] Field of Search ................. 252/90, 142, 156, 174, 252/174.13, 350; 8/137

[56] References Cited

U.S. PATENT DOCUMENTS

| | | | |
|---|---|---|---|
| 3,658,727 | 4/1972 | Mast | 252/538 |
| 3,723,327 | 3/1973 | Van Kampen et al. | 252/110 |
| 3,761,415 | 9/1973 | Gould | 252/89 |
| 4,028,262 | 6/1977 | Cheng | 252/135 |
| 4,210,550 | 7/1980 | Cornelissens | 252/100 X |
| 4,234,442 | 11/1980 | Cornelissens | 252/92 X |
| 4,243,543 | 1/1981 | Guilbert et al. | 252/105 |
| 4,534,876 | 8/1985 | Browne | 252/90 |

*Primary Examiner*—John E. Kittle
*Assistant Examiner*—Mukund J. Shah
*Attorney, Agent, or Firm*—Cushman, Darby & Cushman

[57] ABSTRACT

Method for washing of textiles in hard water and phosphate free detergent compositions for use therein.

A method is provided for washing of textiles in hard water under substantial exclusion of phosphates by combined use of an inorganic salt derived from carbondioxide, an acidic compound devoid of forming a precipitate with the calcium and magnesium ions in the washing liquor at usual dosage, and a surface active agent devoid of forming a precipitate under these conditions, maintaining the pH within the range of 5 to 8, and the temperature at at most 70° C. Also provided is a detergent composition comprising the above mentioned components in such a ratio that the pH of a 0.5% by weight solution in a washing liquor is within the range of 5 to 8.

7 Claims, No Drawings

PHOSPHATE-FREE DETERGENT COMPOSITION FOR WASHING OF TEXTILES IN HARD WATER

This is a division of application Ser. No. 493,273 filed May 10, 1983, now U.S. Pat. No. 4,534,876.

BACKGROUND OF THE INVENTION a. Field of the Invention

The present invention relates to a method for washing of textiles in hard water and phosphate-free detergent compositions for use therein.

b. Description of the Prior Art

Detergent compositions as developped since the nineteen fourties in general contain phosphates, which have caused environmental pollution. For some time it has been desirable to develop detergent compositions and detergent additives having reduced or no phosphate contents, with a substantially equivalent washing performance and at reasonable price.

It is known that phosphates are incorporated in detergent compositions to bind calcium and magnesium ions present in the water, thus preventing the formation of water insoluble calcium- and magnesium salts of the alkalizing agents and thereby also preserving the surfactant properties of the surface active agents.

Phosphate replacements proposed hitherto are predominantly sodium salts of polyvalent organic acids, such as for example sodium nitrilotriacetate(N.T.A.), sodium citrate and synthetic polyelectrolytes.

However, these are more expensive or less efficient than the customary tripolyphosphate builders(STP) or otherwise unsatisfactory for one reason or another. Thus N.T.A. is more expensive than STP, hygroscopic and has had negative publicity on health factors.

Replacement of STP by sodium citrate would require such an amount, in particular for high temperature washing, that the costs would be unacceptable.

Polyelectrolytes, such as for example sodium acrylates, have a good detergency performance, but they are expensive and have a problematic biodegradability. Many of these organic builders would constitute a new source of water pollution, when used as a sole builder.

Therefore a partial replacement is also encountered; thus zeolites are used in a 1:1 ratio with polyphosphates, thus replacing half of the phosphate contents and reducing their polluting effect only partially.

In the era of the classical fatty acid soaps, preceding the widespread use of phosphates in detergents, alkali metal carbonates were commonly used together with soap in household laundering. The effect of these carbonates was the precipitation of the calcium- and magnesium ions present so as to prevent these ions from binding the fatty acids of the soap. In this way some saving of soap could be achieved, but the calcium- and magnesium carbonates tend to accumulate on the washed fabric, resulting in harshness of the fabric and also deposition on the electrical heating means of washing-machines, causing overheating and early breakdown of the heating means.

Numerous attempts have been made to prepare detergent compositions with sodium carbonate as the main builder, i.e. with complete or substantially complete replacement of the customary phosphates. None of these previous attempts has been completely successful in solving the problems as stated above.

In U.S. Pat. No. 3,996,149 a finely dispersed silicate precipitate is proposed as a nucleant and precipitation aid in order to reduce precipitation on the fabric. However, the precipitation of calciferous deposit is not prevented entirely, causing additional wear of the fabric by the incrustation.

British Patent Specifications Nos. 1,424,406 and 1,437,950 both describe the application of calcite as a nucleant. It not only has the same drawback as the above mentioned dispersed silicate, but in addition the excessively large surface area the fine powder must have to cause the desired effect, makes this method an expensive one.

Cobuilders which have been used together with sodium carbonate as the main builder, have not been particularly successful. Many of them prevent carbonates of bicarbonates from functioning effectively as a precipitating softener in the washing liquor, probably by interference with the growth of crystallites of calcium carbonate, which growth is highly retarded. Utilization of this retarding effect has been proposed in U.S. Pat. Nos. 3,850,852 and 3,925,228 and British Patent Specification No. 2,007,704, wherein citrates, phosphonates and phosphates respectively are proposed as a cobuilder in carbonate-based detergents in limited quantities. Some of the cobuilders mentioned are in their acidic state. However, this is immaterial for practical purposes, as any acidic component will react with the excess of carbonate during processing or storage. Thus the acidic components will be neutralized by the alkakaline components before application in the presence of water. In addition it should be observed that in the latter three patent specifications mentioned above, the surface active agents always comprise fatty acid soaps and alkylbenzene-sulphonates, which are of a type causing a precipitation with the Ca and Mg ions in hard water.

Other systems, wherein initially a cobuilder is dissolved in water and subsequently, after a notable lapse of time, carbonate is released to be dissolved in the water, are described in U.S. Pat. Nos. 3,761,415, 4,210,550 and 4,234,442. The conditions in a solution, thus obtained, are initially acidic and subsequently alkaline at a pH of at least 9, thus still forming a precipitate of carbonate in the end. As stated above, the precipitate of carbonate will cause incrustations and as a result thereof additional wear of the fabric.

In fact all known methods discussed above require the carbonate to precipitate in order to perform a softening action. This softening action is necessary as the use of precipitating active components is implied in all of them. Thus in the latter three publications and in U.S. Pat. No. 4,093,417 the objective is to remove calciferous incrustations of the previous washing cycles by means of predosing or pre-release of an acidic component, or even by an acidic pre-wash. The time lapse between the release of the acidic component and the alkaline component is obtained by coating and granulation techniques, twin sachets and even by addition of insoluble calcium- and magnesium salts, as proposed in German Patent Application No. 2,916,416. It goes without saying that such an addition of calcium- and magnesium salts to a main wash of pH of at least 9 would be very undesirable.

Dutch Patent Application No. 74 05231 describes a detergent composition blended to a water containing product, containing in combination an acidic component and an alkaline component, the ration of these components being such, that the pH at dissolution is in the range of 5 to 8.5. This pH range can be achieved only immediately after the preparation of the detergent composition, which comprises carbonate. It appears that with time the pH at dissolution of such a composition will increase. This is caused by reaction of the acidic components and the alkaline carbonate; even in a dry mixture. Similarly compositions as described in U.S. Pat. No. 4,009,114, comprising citric acid powder and carbonate granules show the neutralizing reaction at least in part before the composition is dissolved in water.

In addition it should be observed that all main washes described are carried out at a pH of at least 9.

SUMMARY OF THE INVENTION

The inventor of the present invention in her study on washing of textiles and detergent compositions for use therein has found that substantially improved results can be obtained, in particular in removing and preventing incrustation.

An object of this invention is to provide a method for washing of textiles in hard water at a temperature of at most 70° C. avoiding precipitation of components responsible for the hardness of water.

Another object of the invention is to provide a substantially phosphate-free detergent composition for use in hard water at temperatures of at most 70° C. avoiding precipitation of components responsible for the hardness of water while showing satisfactory detergency A further object of the invention is to provide a substantially phosphate-free detergent composition on the basis of low cost materials, comprising as detergency builder at least one inorganic salt derived from carbondioxide, in combination with an acidic compound and a surface active agent, providing in a solution of 0.5% by weight a pH within the range of 5 to 8.

A still further object of the invention is to provide a detergent composition avoiding the formation of and removing existing incrustation on textiles.

DETAILED DESCRIPTION OF THE INVENTION

According to the present invention it has been found, that the disadvantages associated with the application of carbonates in detergents can be overcome at least in part and usually completely, by adding the carbonate physically separated from, but substabtially simultaneous with an acidic compound to a washing solution in a ratio providing a pH in the range of 5 to 8 throughout the complete washing cycle.

These principal components can be added to the washing liquor either by separate handling or by being physically separated in a washing powder, such as for example by the presence of a water soluble coating on at least one of the components, or by impregnation. It is thus possible to obtain good washing results at a relatively moderate washing temperature of at most 70° C., provided the proper pH with the range mentioned above, is maintained. It has also been found, that any incrustation present on fabrics prior to washing, will disappear gradually, no new incrustation being formed. Unless the acidic component and the alkaline carbonate component are kept physically separated or are prevented from reacting in some other way, the composition will loose its activity largely or completely.

In addition it has been found, that by application of the invention the "hand" of the washed fabric improved noticeable after several washings; this is attributed to the gradual dissolution of previously existing incrustation. The present invention relates to a method for washing of textiles in hard water at a temperature of at most 70° C. with complete of substantially complete exclusion of phosphates, comprising substantially simultaneous addition to the washing liquor of:

(a) at least one watersoluble inorganic salt derived from carbon dioxide, inclusive hydrates, prehydrates and percarbonates thereof;

(b) at least one acidic compound which does not form a precipitate with the calcium and magnesium ions in the washing liquor at usual dosage;

(c) at least one surface active compound, which does not form a precipitate with the calcium and magnesium ions in the washing liquor at usual dosage, the ratio of these components being such that the pH of the resulting washing liquor is maintained within the range of 5 to 8, and components (a) and (b) being added physically separated.

Preferably about 0.05 to 1% by weight of a sequestrant for iron and trace elements are added in order to prevent any detrimental effect of iron and trace elements on the ultimate washing result, such as yellowing.

An additional improvement in the washing results can be obtained by adding at least one proteolytic enzyme; it is then preferable to keep the temperature of the washing liquor at at most 60° C.

Other usual components of detergent compositions other than phosphates may also be added in addition to the components mentioned above. Examples of such additives are lather boosters, lather depressants, bleaching agents on the basis of oxygen, chlorine releasing bleaching agents, carboxymethylcellulose, fabric softening agents, fluorescent agents, germicides, dyes, fillers, anti-redeposition agents, inorganic salts, perfumes. Though it is preferred that components (a) and (b) are added separately, they may be added simultaneously or together provided the conditions as described above are met.

The invention also relates to a phosphate-free or substantially phosphate-free detergent composition for washing of textiles in hard water at a temperature of at most 70° C. comprising:

(a) at least one water soluble inorganic salt derived from carbondioxide, inclusive hydrates, perhydrates and percarbonates thereof;

(b) at least one acidic compound, which does not form a precipitate with the calcium and magnesium ion in the washing liquor at usual dosage;

(c) at least one surface active compound, which does not form a precipitate with the calcium and magnesium ions in a washing liquor at usual concentration, at least one of the components (a) and (b) being separated from the other one by a coating, impregnation or some other way of physical separation, the ratio of these components such that the pH of a 0.5% by weight solution in the washing liquor is within the range of 5 to 8.

Preferably about 0.05 to 1% by weight of a sequestrant for iron and trace elements are added in order to prevent any detrimental effect of iron and trace elements on the ultimate washing result, such as yellowing.

It is also advantageous to incorporate a proteolytic enzyme; it is then preferable to keep the temperature of the washing liquor at at most 60° C.

Other usual components of detergent compositions other than phosphates may also be added in addition to the components mentioned above, such as examplified above.

The detergent compositions according to the invention can be formulated in such a way, that all components are included in one single package, wherein the components (a) and (b) are being kept separated in a suitable manner in order to prevent premature chemical reaction of these components. Alternatively components (a) and (b) can be filled off in separate packages, that may be added simultaneously or jointly to the washing liquor.

Examples of suitable watersoluble inorganic salts derived from carbon dioxide are alkali metal, ammonium and substituted ammonium salts, such as carbonates and bicarbonates, inclusive percarbonates, double salts and hydrates of any one of these, as well as mixtures thereof. As an example of commercially available double salts are mentioned sesquicarbonates. In commercial laundries carbondioxide may be introduced into the washing liquor instead of the addition of any one of the above salts.

Examples of the acidic compounds suitable for use in the present invention are the short chain monocarboxylic acids with 1 to 3 carbon atoms, such as formic, acetic, propionic acids and their corresponding peracids, and glycolic and lactic acids; aliphatic di- and tricarboxylic acids, such as oxalic, malonic, tartaric, succinic, adipic, sebacic, azelaic, glutaric, fumaric, maleic and citric acids; aromatic acids, such as sulphamic, glutaminic, gluconic, acrylic and methacrylic acids. Other suitable acidic components include inorganic hydrogen salts, such as sodium and potassium bisulphates, their perhydrosulphates; phosphonic acid; aminopolyacetic acids, such as nitrilotriacetic acid and ethylene diamine tetraacetic acid and ammoniumhydroxyacetic acid.

Examples of suitable surface active agents for use in the method according to the invention or in the detergent composition according to the invention are: nonionic surface active agents, such as aromatic alkylates with 1 to 30, preferably 6 to 18, units of ethylene dioxide per molecule, and preferably derived from fatty alcohols with 1 to 20, preferably 12 to 18 carbon atoms; condensation products of ethylene oxide, propylene oxide and ethylenediamine and in general the reaction products of aliphatic alcohols, acids or alkylphenols with alkylene oxides, in particular ethylene oxide, either alone or in combination with propylene oxide. Also suitable are tertiary amine oxides and tertiary phosphine oxides with long chains and dialkylsulphoxides. Mixtures of amine oxides with ethoxylated nonionic compounds can also be used.

Other suitable surface active compounds are anionic surface active agents, such as sulphates, preferably primary and secondary sulphates. Of these are most preferred some secondary alkylsulphates, in which the sulphate group is predominantly attached at the 2- or 3-position, in particular sulphates with 16 to 18 carbon atoms, and the primary alcohol sulphates with 15 and 16 carbon atoms. Other suitable anionic detergents are alkylethersulphates with the formula $$RO(C_2H_4O)_xSO_3M,$$

wherein R represents an alkylgroup with 1 to 20 carbon atoms or an alkenylgroup with 2 to 20 carbon atoms, and x is equal to 1 to 30. M represents a salt-forming cation or hydrogen. Preferably R contains 14 to 18 carbon atoms and x equals 6 to 8. Examples of such compounds are sodium coconutethersulphate and tallow ether sulphate. Other anionic organic surface active agents in this context are alkali metal, ammonium and substituted ammonium salts of α-sulphonated fatty acid esters, wherein the esters contain 15 to 25 carbon atoms, especially the 2-acyloalkane-1-sulphonic acids, wherein the acylgroup contains an alkylgroup with 1 to 20 carbon atoms or an alkenylgroup with 2 to 20 carbon atoms and wherein the main chain is an alkylgroup with 12 to 20 carbon atoms.

Suitable sequestrants for iron and trace elements are sodium nitrilotriacetate, sodium ethylenediaminotetraacetic acid (EDTA) and polyphosphonic acid, in particular ethyleneaminomethylenephosphonate with the formula $$(CH_2)_{2n}N_{n+1}(CH_2PO_3H_2)_{n+3},$$

wherein n is an integer in the range of 1 to 4; preferably $n=1$.

If desired and if permitted the composition according to the invention may comprise a small quantity of phosphate that may promote the removal of specific incrustations from textiles.

The detergent compositions according to the present invention may be used as powders, granules or tablets. Tablets may include one or more tabletting aids, such as for example polyglycols, cellulose derivatives, polyvinylpyrrolidone, vinylpyrrolidone/vinylacetate copolymers, acacia gum and gelatine.

The components (a) and (b) are preferably used in a ratio of about 2:1 molar equivalents; other ratios may be used, provided that in an aqueous solution the resulting pH remains in the range of 5 to 8.

The invention is illustrated by the following examples, which are not intended as a limitation of the present invention.

EXAMPLE 1

The following components have been added to a washing liquor, the sodium carbonate being added separately and distinct from the remaining components. These latter were added to the washing liquor as a dry mixture. The ratio of bicarbonate to bisulphate, expressed in molar equivalents was 1:0.6. The quantities in this and the following examples are expressed in percentages by weight.

| | |
|---|---|
| Non-ionic detergent surfactant (Tergitol 15-S-7, trademark) | 15 |
| Sodium bisulphate monohydrate | 42 |
| Optical brightener (Tinopal CBS-X, trademark) | 0.07 |
| Carboxy methyl cellulose (C.M.C.) | 1.5 |
| Sodium bicarbonate | 42 |
| | 100 |

Washing liquors have been repeatedly prepared for washing a set of test-cloths therein under the following conditions:

| | |
|---|---|
| Detergent concentration | 5 g/l |
| Washing temperature (of bath) | 60° C. |
| Washing time | 45 minutes |
| Rinsing in cold water | 1 time |

The test cloths have been dried after each washing cycle.

The test cloths consisted of squares of 15×15 cm, cut from used cotton bedcloths, that had been washed a number of times in conventional detergent compositions before.

After 16 successive washings the following results were obtained:

| | | |
|---|---|---|
| Ash content in % by weight: | before the test | 0.97 |
| | after 16 washings | 0.83 |

It appears from these results, that not only the deposition of new incrustations is prevented, but that existing incrustations are gradually removed.

Repetition of the same washing process without using any detergent for 16 cycles, resulted in an ash content of 4.8% by weight.

The ash content in this and the following examples was determined by incineration in an oven at 600° C. for 2 hours.

For comparison washing liquors prepared from a commercial detergent composition comprising tripolyphosphate, have been tested against a detergent composition according to the following table, which had been obtained by intimately dry mixing of all components.

| Component (in % by weight) | dry mixture | commercial product |
|---|---|---|
| Alkylbenzenesulfonate(ABS) | | 8 |
| Nonionic detergent surfactant (Tergitol 15-S-7) | 11 | 1.5 |
| Fatty acid soap | — | 2 |
| Sodium tripolyphosphate(STP) | — | 65 |
| Sodium bicarbonate | 33 | — |
| Sodium bisulphate monohydrate | 55 | — |
| Carboxymethylcellulose | 1 | 1 |
| Enzyme | — | 7-9 GU/mg |
| Optical brightener (Tinopal CBS-X) | 0.05 | ? |
| Other compents up to 100 | | |

The result of repeated washings with these conditions, expressed in the ash content after 18 cycles, was:

| | ash content in % by weight |
|---|---|
| Phosphateless composition | 1.36 |
| Commercial product | 0.425 |

From these results it can be seen, that washing with the dry mixture caused an increased ash content; presumably the acidic and alkaline components had interreacted in the dry mixture during the storage period of about 20 days after having been prepared at the start of the test period. On the other hand, the commercial product caused a notable reduction of the ash content; this implies however, that a considerable quantity of tripolyphosphate in the effluent water has to be accepted, with all ensuing ecological consequences.

During all these tests it is observed that the test cloths did develop a slight yellowish shade with increasing number of washings.

EXAMPLE 2

The following detergent compositions were provided with a sequestrant for iron and trace elements:

| | IIa | IIb |
|---|---|---|
| Nonionic detergent surfactant (Tergitol 15-S-7) | 10 | 10 |
| Sodium bicarbonate | 50 | 50 |
| Sodium bisulphate monohydrate | 37 | 37 |
| Ethylenediaminotetraacetic acid (sodium salt)(EDTA) | — | 1.9 |
| Ethylenediaminotetramethylphosphonic acid(Dequest 2041, trademark)(EDTMP) | 1.9 | — |
| Optical brightener (Tinopal CBS-X) | 0.05 | 0.05 |
| C.M.C. | 1 | 1 |

In both of these compositions the sodium bicarbonate and the sodium bisulphate monohydrate had been separately coated by treating the salt crystals in a coating drum with carbowax, using about 1 part of carbowax per 15 parts of salt. In the above table the salts were present in their coated state.

Each one of these two detergent compositions was tested in separate test runs in an amount of 5 g/l per washing cycle under the same conditions as mentioned in Example 1, except that in this Example 12 washing cycles had been completed when the evaluation of the incrustation was made. The results after 12 cycles were as follows:

| Composition | IIa | IIb |
|---|---|---|
| Ash contents (% by weight of textile) | 0.89 | 0.71 |

As the ash content before these tests was 0.97, a notable reduction of the incrustations was obtained. In addition, as an improvement over previous results, no yellowing of the fabric was observed.

EXAMPLE 3

This example shows several other detergent compositions wherein a carbonate on the one hand and the acidic component(s) on the other hand have been packed separately.

| | IIIa | IIIb | IIIc | IIId |
|---|---|---|---|---|
| Part A | | | | |
| Tergitol 15-S-7 | 10 | 15 | 11 | 15 |
| Primary alcohol sulphate, Na-salt (35% aqueous solution) | 1 | — | — | — |
| EDTA-acid | 1 | 1 | — | 1 |
| Acetic acid(40% aqueous solution) | 15 | — | — | — |
| Sulphamic acid | — | — | 20 | 10 |
| Part B | | | | |
| Sodium bicarbonate | 46 | 48 | 45 | 50 |
| Sodium percarbonate | 15 | — | — | — |
| Sodium perborate | — | — | 12 | — |
| EDTMP | — | — | 1 | — |
| Sodium bisulphate monohydrate | — | 28 | — | — |
| Sodium sulphate | 10 | — | — | — |
| Tetraacetylethylenediamine(TAED) | — | — | 4 | — |
| Carbowax(coating) | — | 6 | 5 | 6 |
| Duplex salt of peroxihydrosulphate (2 $KHSO_5.KHSO_4.K_2SO_4$) | — | — | — | 16 |
| Other components (enzyme, fluorescent, C.M.C., perfume) | 2 | 2 | 2 | 2 |

What is claimed is:

1. A substantially phosphate-free detergent composition for washing of textiles in hard water at a temperature of at most 70° C., wherein are comprised (a) at least one watersoluble inorganic salt derived from carbon dioxide, inclusive hydrates, perhydrates and percarbonates thereof (b) at least one acidic compound devoid of formation of a precipitate with calcium and magnesium ions in hard water at usual dosage (c) at least one surface active compound devoid of formation of a precipitate with calcium and magnesium ions in hard water at usual dosage, at least one of the components (a) and (b) being physically separated from the other one, the ratio of these components being such that the pH of a 0.5% by weight solution in a washing liquor remains within the range of 5 to 8 throughout the complete washing cycle and said composition essentially free of components that will precipitate in hard water during the washing process.

2. A detergent composition according to claim 1, wherein components (a) and (b) are present in one batch.

3. A detergent composition according to claim 1, wherein a proteolytic enzyme is present.

4. A detergent composition according to claim 1, wherein 0.05 to 1% by weight of a sequestrant for iron and trace elements is present.

5. A detergent composition according to claim 2, wherein all components are present in one batch.

6. A detergent composition according to claim 1, wherein at least one of the components (a) and (b) is contained in a separate batch.

7. A detergent composition according to claim 1, wherein it is in the form of a tablet.

* * * * *